United States Patent
Zhao et al.

(10) Patent No.: US 12,280,410 B1
(45) Date of Patent: Apr. 22, 2025

(54) OPTIMIZATION METHOD FOR BENDING REBOUND QUANTITY OF ALUMINUM ROLL FORMING

(71) Applicants: XI'AN HEAVY EQUIPMENT & TECHNOLOGY CO., LTD., Xi'an (CN); Xi'an University of Technology, Xi'an (CN)

(72) Inventors: Xiaohui Zhao, Xi'an (CN); Yali Wu, Xi'an (CN); Dahao Wang, Xi'an (CN); Bo Yang, Xi'an (CN); Feng Ding, Xi'an (CN); Jianfeng Chen, Xi'an (CN); Zuohua Chai, Xi'an (CN)

(73) Assignees: XI'AN HEAVY EQUIPMENT & TECHNOLOGY CO., LTD., Xi'an (CN); Xi'an University of Technology, Xi'an (CN)

( * ) Notice: Subject to any disclaimer, the term of this patent is extended or adjusted under 35 U.S.C. 154(b) by 0 days.

(21) Appl. No.: 18/945,585

(22) Filed: Nov. 13, 2024

(30) Foreign Application Priority Data

May 16, 2024 (CN) .......................... 202410610157.X

(51) Int. Cl.
 B21B 37/16 (2006.01)
 B21B 3/00 (2006.01)

(52) U.S. Cl.
 CPC ............... *B21B 37/16* (2013.01); *B21B 3/00* (2013.01); *B21B 2003/001* (2013.01)

(58) Field of Classification Search
 CPC ..... B21B 37/16; B21B 3/00; B21B 2003/001; B21D 5/14; B21D 5/004
 See application file for complete search history.

(56) References Cited

U.S. PATENT DOCUMENTS

2012/0324971 A1* 12/2012 Simaan ................. B21B 37/28
 72/7.2
2017/0157660 A1 6/2017 Sasaki et al.

FOREIGN PATENT DOCUMENTS

CN 102581087 A 7/2012
CN 106903166 A * 6/2017
(Continued)

OTHER PUBLICATIONS

English translate (CN109226375A), Feb. 6, 2025.*
(Continued)

*Primary Examiner* — Mohammed S. Alawadi
(74) *Attorney, Agent, or Firm* — Bayramoglu Law Offices LLC

(57) ABSTRACT

An optimization method for bending rebound quantity of aluminum roll forming includes the following steps: S1, analyzing the process of aluminum roll forming, and determining decision variables of aluminum rebound quantity and thickness reduction; S2, constructing the optimization model of the bending rebound quantity of aluminum roll forming based on the multi-objective optimization algorithm and clarifying constraints in the process of aluminum roll forming; S3, based on characteristics of the model in S2, proposing the corresponding algorithm to optimize the aluminum rebound quantity and thickness reduction; S4, updating the decision variables that affect the aluminum rebound quantity and thickness reduction; S5, judging the iteration stop condition, and outputting the scheme that improves the bending rebound quantity of roll forming aluminum. The optimization method solves the problem of large bending rebound quantity in roll forming technology, improves the accuracy of roll forming process and production efficiency, and enhances production flexibility.

3 Claims, 2 Drawing Sheets

(56) References Cited

FOREIGN PATENT DOCUMENTS

| | | | | |
|---|---|---|---|---|
| CN | 107310242 A | | 11/2017 | |
| CN | 109226375 A | * | 1/2019 | ........... B21B 27/032 |
| CN | 110457851 A | | 11/2019 | |
| CN | 112052007 A | | 12/2020 | |
| CN | 112559361 A | | 3/2021 | |
| JP | 2011062738 A | * | 3/2011 | |

OTHER PUBLICATIONS

English translate (CN106903166A), Feb. 6, 2025.*
English translate (JP2011062738A), Feb. 6, 2025.*
Jin Xia, et al., Springback Study of U-Section One-Axle Rotary Shaping with Elastic Pad Medium Based on Finite Element Analysis, Journal of Nanjing University of Aeronautics & Astronautics, 2010, pp. 117-121, vol. 42, No. 1.
Shihong Lu, et al., Prediction of SpringBack of the Two-axle Rotary Shaping Based on Neural Network, Materials Science Forum, 2006, pp. 1044-1047, vol. 532-533.

* cited by examiner

OPTIMIZATION METHOD FOR BENDING REBOUND QUANTITY OF ALUMINUM ROLL FORMING

CROSS REFERENCE TO THE RELATED APPLICATIONS

This application is based upon and claims priority to Chinese Patent Application No. 202410610157.X, filed on May 16, 2024, the entire contents of which are incorporated herein by reference.

TECHNICAL FIELD

The invention relates to the field of forming rebound technology of aluminum roll forming, particularly an optimization method for bending rebound quantity of aluminum roll forming.

BACKGROUND

Under the background of the current manufacturing power, quality power, and double carbon strategy, the high-speed rail equipment manufacturing industry has increasingly strict requirements on the structural strength, dimensional accuracy, and product quality of the train head. Aluminum has been widely used in large structural parts such as train heads because of its lightweight, high strength, and corrosion resistance. However, in view of the complexity of the side beam interface of the train head, the large bending modulus, the long length, and the characteristics of variable curvature, the traditional roll forming equipment and process are difficult to meet the needs of high-quality forming preparation when dealing with such complex cross-section and difficult-to-deform aluminum. Therefore, how to improve the accuracy of aluminum processing is particularly important at this time.

In the forming process of large-scale structural parts such as the train head, the roll forming machine will produce a large amount of rebound quantity when bending the aluminum, affecting the machining shape, machining accuracy, and other aspects. It is necessary to change the thickness of the material in order to reduce the rebound quantity, how to ensure that the aluminum can achieve the expected bending shape and maintain sufficient thickness during the roll forming process, that is, how to control the process parameters with high precision during processing is of great significance.

The multi-objective optimization algorithm is a swarm intelligence algorithm for solving optimization problems of multiple conflicting or interrelated objective functions. Those problems require multiple optimization objectives to be considered at the same time, and there may be a mutually restrictive relationship between these objectives, so that the optimization of a single objective is often difficult to realize at the same time, aiming to find a set of solutions that can satisfy each objective in a balanced manner, rather than a single optimal solution. Multi-objective optimization algorithm has higher flexibility and adaptability, in practical applications, the multi-objective optimization algorithm has been widely used in various fields, such as engineering design, logistics planning, etc., which can find the best balance between multiple objectives and maximize the overall efficiency.

SUMMARY

The purpose of the invention is to provide an optimization method for bending rebound quantity of aluminum roll forming, which solves the problem of large bending rebound quantity in roll forming technology and has the advantages of improving the accuracy of the roll forming process, improving production efficiency, and enhancing production flexibility.

In order to achieve the above purpose, the invention provides an optimization method for bending rebound quantity of aluminum roll forming, including the following steps:

S1, analyzing a process of aluminum roll forming, and determining decision variables of aluminum rebound quantity and thickness reduction;

S2, constructing an optimization model of the bending rebound quantity of aluminum roll forming based on a multi-objective optimization algorithm and clarifying constraints in the process of aluminum roll forming;

S3, based on characteristics of the model in S2, proposing a corresponding algorithm to optimize the aluminum rebound quantity and thickness reduction;

S4, updating the decision variables that affect the aluminum rebound quantity and thickness reduction;

S5, judging an iteration stop condition, and outputting a scheme that improves the bending rebound quantity of roll forming aluminum.

Preferably, in S1, digitizing a rebound quantity problem of roll forming in the process of aluminum roll forming, and expressing the current problem by gene sequence, that is, a coding process, when coding the process, it is divided into four parts: a friction coefficient, a die gap, an angle between rollers and a speed difference between an upper roll and a lower roll:

$$[\mu_k \ G_k \ \omega_k \ \Delta v_k] = \begin{bmatrix} \mu_1 G_1 & \omega_1 & \Delta v_1 \\ \mu_2 G_2 & \omega_2 & \Delta v_2 \\ \ldots & \ldots & \ldots \\ \mu_n G_n & \omega_n & \Delta v_n \end{bmatrix} \quad (1)$$

where $\mu$ denotes a friction coefficient of a contact surface between aluminum and the upper roll of a roll forming machine; G denotes a gap between the aluminum and the roll during the roll forming process; $\omega$ denotes an angle between the upper roller and the lower roller; $\Delta v$ denotes the speed difference between the upper roll and the lower roll; n denotes a number of individuals in a population; k={1, 2, 3, . . . , n}.

Preferably, the specific steps of S2 are as follows:

S201, constructing an optimization model of the bending rebound quantity of aluminum roll forming based on a multi-objective optimization algorithm, the rebound quantity and the thickness reduction during aluminum roll forming are two objective functions;

S202, constructing constraints in the optimization model of the bending rebound quantity of aluminum roll forming based on a multi-objective optimization algorithm, the following constraints are included during aluminum roll forming:

$$\mu_{min} \leq \mu \leq \mu_{max} \quad (2)$$

$$G_{min} \leq G \leq G_{max} \quad (3)$$

$$\omega_{min} \leq \omega \leq \omega_{max} \quad (4)$$

$$\Delta v \geq 0 \quad (5)$$

$$f_2 \leq T_{max} \quad (6)$$

Equation (2) is a friction coefficient constraint of the contact surface between the aluminum and the upper roller of the roll forming machine, where $\mu_{min}$ is a minimum allowable friction coefficient during the roll forming process; $\mu_{max}$ is a maximum allowable friction coefficient during the roll forming process; Equation (3) is a gap constraint between the aluminum and the roller during the roll forming process, and $G_{min}$ is a minimum allowable gap during the roll forming process; $G_{max}$ is a maximum allowable gap during the roll forming process; in Equation (4), $\omega_{max}$ denotes a maximum angle between the upper roll and the lower roll, and $\omega_{min}$ denotes a minimum angle between the upper roll and the lower roll; $\Delta v$ in Equation (5) denotes a velocity difference constraint between the upper roll and the lower roll; Equation (6) is a constraint of a required thickness reduction of the aluminum when processing a part, $T_{max}$ is a maximum value of a required thickness reduction.

Preferably, the specific steps of S3 are as follows:

S301, population initialization, initializing the rebound quantity and thickness reduction, population individual number during the aluminum forming process, selection probability and mutation probability of multi-objective optimization model, and setting a maximum number of iterations;

S302, establishing a fitness function, and a specific description formula F is as follows:

$$F = \min(f_1, f_2) \tag{7}$$

where $f_1$ denotes a rebound quantity during the aluminum roll forming; $f_2$ denotes a thickness reduction during the aluminum roll forming.

The specific steps of S4 are as follows:
S401, encoding and decoding;
S402, chromosome sequence crossover operation;
S403, chromosome mutation operation;
S404, environmental selection mechanism.

The specific steps of S401 are as follows:

S4011, the encoding adopts a real number coding method, generating four real numbers randomly in each chromosome of the population, these four real numbers denote a friction coefficient $\mu$ of the contact surface between the aluminum and the upper roll of the roll forming machine, a gap G between the aluminum and the roll during the rolling process, an angle $\omega$ between the upper roll and the lower roll, and a speed difference $\Delta v$ between the upper roll and the lower roll, these real numbers directly correspond to parameter values in a target space;

S4012, when generating four real numbers, it is necessary to ensure that randomly generated values in the chromosome can meet the constraints in S202, and combining the four real numbers ($\mu$, G, $\omega$, $\Delta v$) to form an individual real number coding;

S4013, when there are n individuals in the population, that is, producing n ($\mu$, G, $\omega$, $\Delta v$) combined chromosomes;

S4014, after the coding is completed, the randomly generated values in the chromosome directly correspond to parameter values in the space at this time, so the decoding has also been completed.

The specific steps of S402 are as follows:

S4021, randomly selecting two crossover points $c_1$ and $c_2$ in a coding string of two parent individuals, and establishing a new archive set S;

S4022, after the crossover points are determined, exchanging partial genes of the two parental individuals $p_1$ and $p_2$ between the crossover points to produce new offspring individuals;

S4023, evaluating the newly generated offspring individuals by a target value;

S4024, in an iteration process, if the new offspring individuals are better than some individuals in the archive set S, adding the new offspring individuals to the archive set S, and removing worse individuals from the archive set S.

Preferably, a chromosome sequence mutation method in S403 adopts a population evolution method, and the specific steps are as follows:

S4031, after the chromosomes are crossed, recalculating two target values $f_1$ and $f_2$ of the individual population, and calculating an index value I for each individual, the calculation formula is as follows:

$$I = \frac{f_2 - f_1}{f_2 + f_1} \tag{8}$$

S4032, sorting the index value I of 2N individuals in the population, putting the individuals with a smaller index value I into a first population $P_1$, and putting the individuals with a larger index value I into a second population $P_2$;

S4033, mutating all individuals in the second population $P_2$, the mutation method is a differential mutation.

Preferably, in S404, dividing an environmental selection into an individual convergence selection and a diversity selection, the specific steps are as follows:

S4041, using a Network-based Inference (NBI) method to generate a set of uniformly distributed reference vectors in the target space, the NBI method requires the number M of optimization targets and the number p of each target segmentation, and a segmentation step length is 1/p, the formula for generating a number H of reference vectors is as follows:

$$H = C_{M+p-1}^{p} \tag{9}$$

where C denotes a combination in the permutation and combination; M denotes a number of optimization objectives; p denotes a number of copies of each target segmentation; 1/p denotes the segmentation step length;

S4042, combining the parent and offspring individuals, and the number of populations at this time is 2N, calculating the target values of all individuals, and normalizing the target values of the individuals as follows:

$$\hat{f}_i(x) = \frac{f_i(x) - z_i^{min}}{z_i^{max} - z_i^{min}}, i = 1, 2, \ldots, M \tag{10}$$

where $\hat{f}_i(x)$ denotes a value of an i-th normalized objective function; M denotes a number of objective functions; $z_i^{max}$ and $z_i^{min}$ denote the maximum and minimum values of the i-th objective function on all possible x values, respectively; $f_i(x)$ denotes an objective function value before normalization;

S4043, performing a non-dominated sorting on individuals in a region, and dividing all individuals in the population into different frontiers or levels according to normalized values of the two objectives.

S4044, taking first K frontiers in each region, so that the number of individuals n is greater than N;

S4045, in order to reduce the number of populations to N, using a hierarchical clustering method to cluster all currently retained individuals, and deleting a individuals from each class so that the number of populations is exactly N at this time.

Preferably, S5 is as follows:

setting the maximum number of iterations, when a number of individual evolution iterations in the population reaches the maximum number of iterations, obtaining the feasible solution satisfying the constraint condition;

then, using a multi-attribute decision-making technique for order preference by similarity to ideal solution (TOPSIS) method to select an optimal solution in a set of solutions, and calculating distances from each individual in the set of solutions to an optimal point and a worst point respectively, and sorting all obtained distances, where a solution closest to the optimal point and furthest from the worst point is regarded as the optimal solution.

Therefore, the invention adopts the above-mentioned optimization method for bending rebound quantity of aluminum roll forming, which has the following beneficial effects:

1) The accuracy of roll forming process is improved. The multi-objective optimization algorithm is used to deal with the two contradictory optimization objectives of bending rebound quantity and thickness reduction, and the best balance point is found between the objectives, at the same time, the optimization of these two key indicators can ensure that the aluminum can not only form the expected bending shape in the roll forming process, but also maintain sufficient thickness, so as to meet the requirements of product accuracy in actual production.

2) The production efficiency is improved. The multi-objective optimization algorithm can find the best process combination according to the specific process parameters of the roll forming machine and the characteristics of the aluminum, and accurately control the operating parameters of the roll forming machine, so that the aluminum can form the predetermined shape quickly and accurately during the roll forming process.

3) The production flexibility is enhanced. The customized optimization can be carried out for aluminum of different types, specifications, and materials. It means that the roll forming machine can adapt to more kinds of production tasks and improve the flexibility and diversity of the production line. Enterprises can quickly adjust the process parameters of the roll forming machine according to the requirements to meet the production needs of different products.

In summary, the multi-objective optimization algorithm is used to optimize the bending rebound quantity and thickness reduction of the roll forming machine in the invention, which has the advantages of improving the accuracy of the roll forming process, improving production efficiency, and enhancing production flexibility. It can not only avoid the problem of reducing the production accuracy due to errors caused by manual experience, but also reduce the time spent in the process of manual adjustment of process parameters, which can improve the processing accuracy and processing efficiency.

The following is a further detailed description of the technical scheme of the invention through drawings and an embodiment.

DETAILED DESCRIPTION OF THE EMBODIMENTS

The following is a further explanation of the technical scheme of the invention through drawings and embodiments.

Unless otherwise defined, the technical terms or scientific terms used in the invention should be understood by people with general skills in the field to which the invention belongs.

Embodiment One

Figure 1:
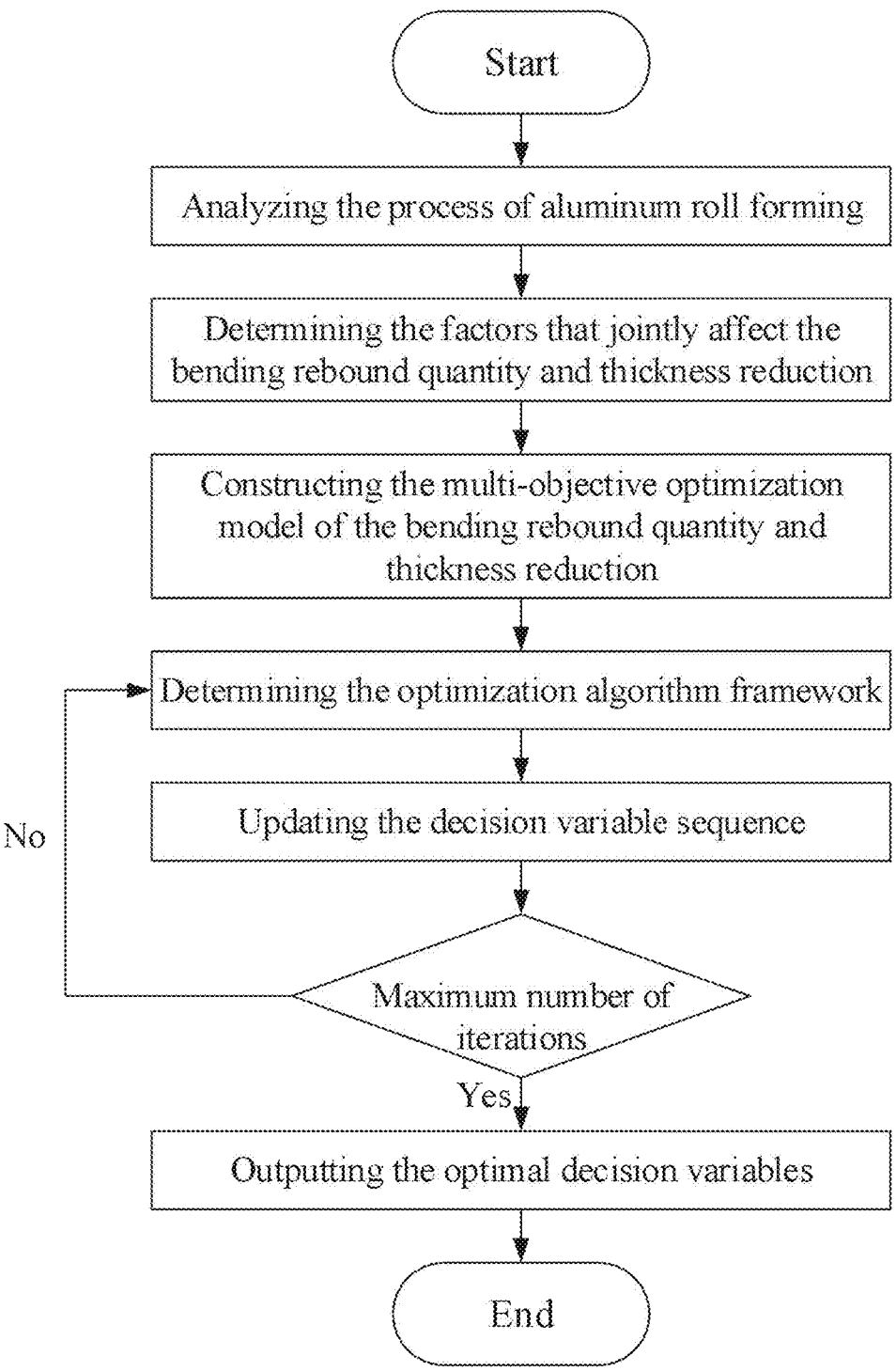
FIG. 1 is an overall flow chart of the embodiment of the optimization method for bending rebound quantity of aluminum roll forming.

As shown in FIG. 1, the invention provides an optimization method for bending rebound quantity of aluminum roll forming, which includes the following steps:

S1, the process of aluminum roll forming is analyzed, and the decision variables of aluminum rebound quantity and thickness reduction are determined; the rebound quantity problem of roll forming in the process of aluminum roll forming is digitized, and the current problem is expressed by gene sequence, that is, the coding process, when coding the process, it is divided into four parts: the friction coefficient, the die gap, the angle between rollers and the speed difference between the upper roll and the lower roll:

$$[\mu_k \ G_k \ \omega_k \ \Delta v_k] = \begin{bmatrix} \mu_1 G_1 & \omega_1 & \Delta v_1 \\ \mu_2 G_2 & \omega_2 & \Delta v_2 \\ \ldots & \ldots & \ldots \\ \mu_n G_n & \omega_n & \Delta v_n \end{bmatrix} \quad (1)$$

where μ denotes the friction coefficient of the contact surface between the aluminum and the upper roll of the roll forming machine; G denotes the gap between the aluminum and the roll during the roll forming process; w denotes the angle between the upper roller and the lower roller; Δv denotes the speed difference between the upper roll and the lower roll; n denotes the number of individuals in a population; k={1, 2, 3, . . . , n}.

Figure 2:
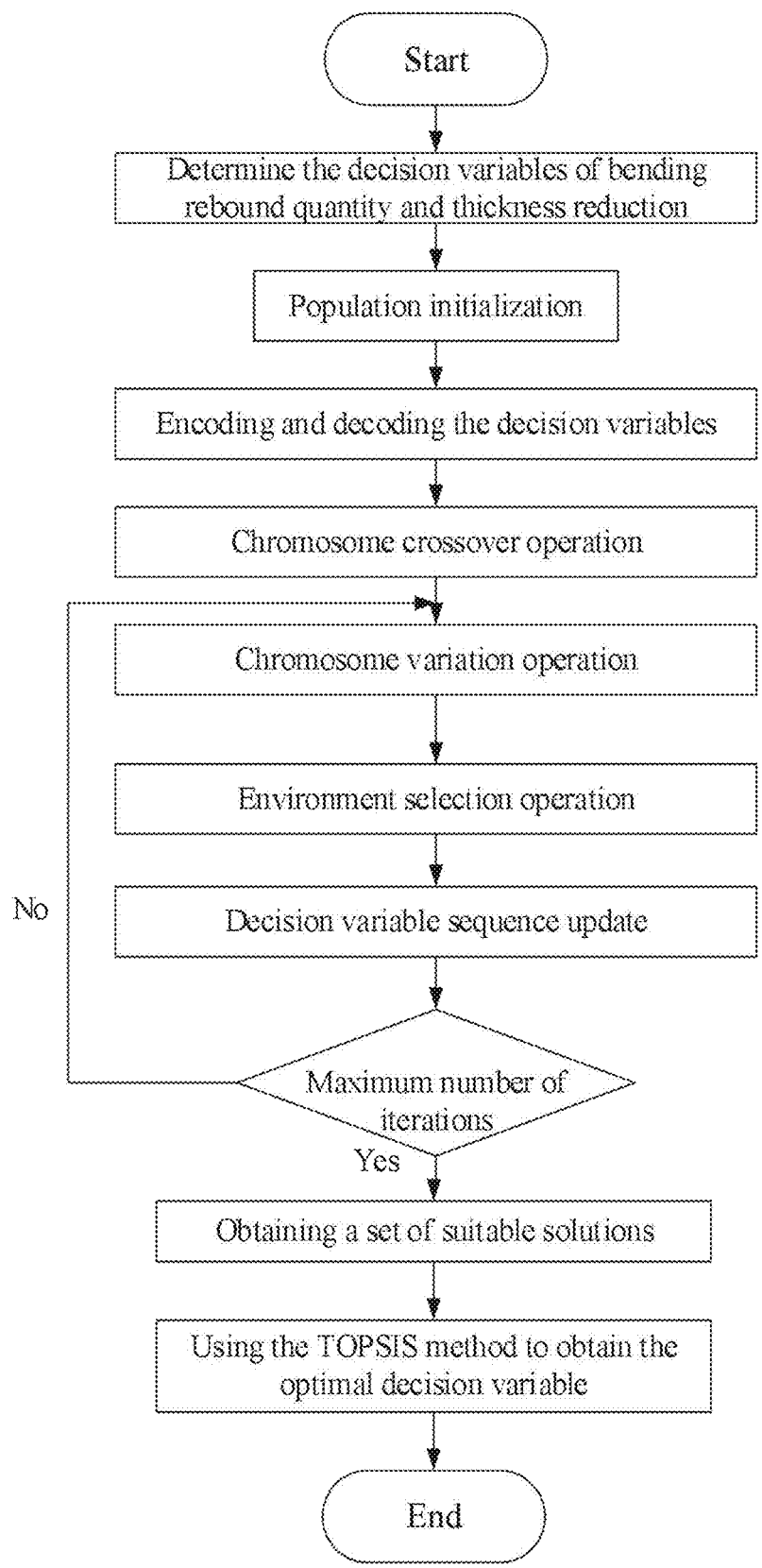
FIG. 2 is a multi-objective optimization algorithm flow chart of the embodiment of the optimization method for bending rebound quantity of aluminum roll forming.

S2. The optimization model of the bending rebound quantity of aluminum roll forming based on a multi-objective optimization algorithm is constructed and the constraints in the process of aluminum roll forming are clarified; the flow chart of the multi-objective optimization algorithm is shown in FIG. 2, the specific steps are as follows:

S201, the optimization model of the bending rebound quantity of aluminum roll forming based on the multi-objective optimization algorithm is constructed, the rebound quantity and the thickness reduction during aluminum roll forming are two objective functions;

S202, constructing constraints in the optimization model of the bending rebound quantity of aluminum roll forming based on the multi-objective optimization algorithm, the following constraints are included during aluminum roll forming:

$$\mu_{min} \leq \mu \leq \mu_{max} \quad (2)$$

$$G_{min} \leq G \leq G_{max} \quad (3)$$

$$\omega_{min} \leq \omega \leq \omega_{max} \quad (4)$$

$$\Delta v \geq 0 \quad (5)$$

$$f_2 \leq T_{max} \quad (6)$$

Equation (2) is the friction coefficient constraint of the contact surface between the aluminum and the upper roller of the roll forming machine, where $\mu_{min}$ is the minimum allowable friction coefficient during the roll forming process; $\mu_{max}$ is the maximum allowable friction coefficient during the roll forming process; If the $\mu$ value is too large, more energy is needed to overcome the friction between the aluminum and the upper roll, if the $\mu$ value is too small, the aluminum will slip or vibrate during transportation; Equation (3) is the gap constraint between the aluminum and the roller during the roll forming process, and $G_{min}$ is the minimum allowable gap during the roll forming process; $G_{max}$ is the maximum allowable gap during the roll forming process; whether G is too large or too small, the bending accuracy will be lower; in Equation (4), $\omega_{max}$ denotes the maximum angle between the upper roll and the lower roll, and $\omega_{min}$ denotes the minimum angle between the upper roll and the lower roll; $\Delta v$ in Equation (5) denotes the velocity difference constraint between the upper roll and the lower roll; Equation (6) is the constraint of the required thickness reduction of the aluminum when processing a part, $T_{max}$ is the maximum value of the required thickness reduction.

S3, The algorithm framework is constructed to reduce the aluminum rebound quantity and thickness reduction during processing, and the model in S2 is optimized, the specific steps are as follows:

S301, population initialization, the rebound quantity and thickness reduction, population individual number during the aluminum forming process, selection probability, and mutation probability of multi-objective optimization model are initialized, and the maximum number of iterations is set;

S302, the fitness function is established, and the specific description formula F is as follows:

$$F = \min(f_1, f_2) \quad (7)$$

where $f_1$ denotes the rebound quantity during the aluminum roll forming; $f_2$ denotes the thickness reduction during the aluminum roll forming. Both f and $f_2$ are functions of the friction coefficient $\mu$ of the contact surface between the aluminum and the upper roll of the roll forming machine, the gap G between the aluminum and the roll during the roll forming process, the angle $\omega$ between the upper roll and the lower roll, and the speed difference $\Delta v$ between the upper roll and the lower roll.

S4, the decision variables that affect the aluminum rebound quantity and thickness reduction are updated, the specific steps are as follows:

S401, encoding and decoding; the specific steps are as follows:

S4011, because the accuracy of binary coding is easy to be affected when encoding two decision variables, in order to improve the accuracy of chromosome description, the real number coding method is adopted, four real numbers in each chromosome of the population are randomly generated, and these four real numbers denote the friction coefficient $\mu$ of the contact surface between the aluminum and the upper roll of the roll forming machine, the gap G between the aluminum and the roll during the rolling process, the angle $\omega$ between the upper roll and the lower roll, and the speed difference $\Delta v$ between the upper roll and the lower roll, these real numbers directly correspond to parameter values in the target space;

S4012, when generating four real numbers, it is necessary to ensure that randomly generated values in the chromosome can meet the constraints in S202, and the four real numbers ($\mu$, G, $\omega$, $\Delta v$) are combined to form an individual real number coding;

S4013, when there are n individuals in the population, that is, n ($\mu$, G, $\omega$, $\Delta v$) combined chromosomes are produced;

S4014, after the coding is completed, the randomly generated values in the chromosome directly correspond to the parameter values in the space at this time, so the decoding has also been completed.

S402, chromosome sequence crossover operation, the two-point crossover strategy of introducing an external archive set is adopted in chromosome sequence crossover, that is, two points are randomly selected in a chromosome for crossing, and in the crossing process, external archives are introduced to save excellent individuals or gene segments, the specific steps are as follows:

S4021, two crossover points $c_1$ and $c_2$ in the coding string of two parent individuals are randomly selected, the positions of the two crossover points are random, and a new archive set S is established;

S4022, after the crossover points are determined, partial genes of the two parental individuals $p_1$ and $p_2$ between the crossover points are exchanged to produce new offspring individuals;

S4023, the newly generated offspring individuals are evaluated by the target value, the target value is better when it is smaller;

S4024, in the iteration process, if the new offspring individuals are better than some individuals in the archive set, the worse individuals are removed from the archive set, and the new offspring individuals to the archive set S.

S403, chromosome mutation operation; in which the chromosome sequence mutation method adopts the population evolution method, and the specific steps are as follows:

S4031, after the chromosomes are crossed, two target values $f_1$ and $f_2$ of the individual population are recalculated, and the index value I is calculated for each individual, the calculation formula is as follows:

$$I = \frac{f_2 - f_1}{f_2 + f_1} \quad (8)$$

S4032, the index value I of 2N individuals in the population is sorted, the individuals with a smaller index value I is put into the first population $P_1$, and the individuals with a larger index value I is put into a second population $P_2$;

S4033, all individuals in the second population $P_2$ are mutated, the mutation method is the differential mutation, as shown in the following formula:

$$X_{new}^d = \begin{cases} rand(R_{d_L}, R_{d_H}) & rand < P_r \\ X_{old}^d + rand * (X_1^d - X_2^d), & others \end{cases} \quad (9)$$

where $R_{dL}$ and $R_{dH}$ denote the minimum and maximum values on the d-th dimension, that is, the upper and lower bounds of the d-th dimension; $X_1^d$ and $X_2^d$ are two different individuals randomly selected in the current population; $P_r$ denotes the open probability of random setting; $X_{new}^d$ denotes the individual after the mutation on the d-th dimension; $X_{old}^d$ denotes the individual before the mutation on the d-th dimension.

S404, environmental selection mechanism, the environmental selection is divided into individual convergence selection and diversity selection, the specific steps are as follows:

S4041, the NBI method is used to generate a set of uniformly distributed reference vectors in the target space, the NBI method requires the number M of optimization targets and the number p of each target segmentation, and the segmentation step length is 1/p, the formula for generating the number H of reference vectors is as follows:

$$H = C_{M+p-1}^p \quad (10)$$

where C denotes the combination in the permutation and combination; M denotes the number of optimization objectives; p denotes the number of copies of each target segmentation; 1/p denotes the segmentation step length; assuming the number of targets M=2, and the number of copies of each target segmentation p=2, that is, three uniform reference vectors are generated by the NBI method to divide the target space into four spaces with the equal size.

S4042, the parent and offspring individuals are combined, and the number of populations at this time is 2N, the target values of all individuals are calculated, and the target values of the individuals are normalized as follows:

$$\hat{f}_i(x) = \frac{f_i(x) - z_i^{min}}{z_i^{max} - z_i^{min}}, i = 1, 2, \ldots, M \quad (11)$$

where $\hat{f}_i(x)$ denotes the value of the i-th normalized objective function; M denotes the number of objective functions; $z_i^{max}$ and $z_i^{min}$ denote the maximum and minimum values of the i-th objective function on all possible x values, respectively; $f_i(x)$ denotes the objective function value before normalization;

S4043, the non-dominated sorting is performed on individuals in the region, and all individuals in the population are divided into different frontiers or levels according to the normalized values of the two objectives; if $x_A$ and $x_B$ satisfy the following formula, then $x_A$ is a non-dominated solution, by sorting the individuals in each region in this way, multiple frontiers can be obtained:

$$f_1(X_A) \leq f_1(X_B)$$

$$f_2(x_A) < f_2(x_B) \quad (12)$$

S4044, the first K frontiers in each region is taken so that the number of individuals n is greater than N;

S4045, in order to reduce the number of populations to N, then the hierarchical clustering method is used to cluster all currently retained individuals, and a individuals from each class are deleted so that the number of populations is exactly N at this time.

S5, the iteration stop condition is judged, and the scheme that improves the bending rebound quantity of roll forming aluminum is output, specifically:

the maximum number of iterations is set, when the number of individual evolution iterations in the population reaches the maximum number of iterations, the feasible solution satisfying the constraint condition is obtained;

then, the multi-attribute decision-making TOPSIS method is used to select the optimal solution in the set of solutions, and the distances from each individual in the set of solutions to the optimal point and the worst point are calculated respectively, and all obtained distances are sorted, where the solution closest to the optimal point and furthest from the worst point is regarded as the optimal solution, specifically includes the following steps:

S501, the attribute value is normalized according to Formula (13), and then the weighted sum of the attributes of each solution is calculated according to Formula (14), and the weight of each attribute is set to be the same.

$$r_{ij} = \frac{x_{ij}}{\sqrt{\sum_{k=1}^{m} x_{kj}^2}}, i = 1, \ldots, m; j = 1, \ldots, n \quad (13)$$

$$u_{ij} = r_{ij} * w_j \quad (14)$$

where $r_{ij}$ denotes the normalized attribute value, and $X_{ij}$ denotes the j-th attribute value of the i-th scheme; m denotes the number of schemes to be evaluated; n denotes the number of attribute values; $W_j$ denotes the weight corresponding to the j-th attribute; $X_{ij}$ denotes the j-th attribute value of the k-th scheme; $u_{ij}$ denotes the attribute weighted sum of the j-th attribute of the i-th target.

S502, the locations of the optimal point $A^+ = \{u_1^+, \ldots, u_n^+\}$ and the worst point $A^- = \{u_1^-, \ldots, u_n^-\}$ are determined, according to the calculation of Formula (14), the sum of the weighted values of all attributes in the value in $u_{ij}$ is the value of $u_i$. $u_1^+$ is the maximum value of the attribute of the first target, $u_n^+$ is the maximum value of the attribute of the n-th target, and the maximum values of the attributes of the n targets constitute the optimal point set $A^+$; $u_1^-$ is the attribute minimum value of the first target, $u_n^-$ is the attribute minimum value of the n-th target, and the attribute minimum values of the attributes of the n targets constitute the worst point set $A^-$.

The distances from each scheme to the optimal point and the worst point are calculated according to Formula (15) and Formula (16), where $B_i^+$ denotes the distance from each scheme to the optimal point, and $B_i^-$ denotes the distance from each scheme to the worst point. The optimal point of the first target attribute is the maximum value of the attribute in the scheme, and the worst point is the minimum value of the attribute in the scheme. The optimal point of the second target attribute is the minimum value of the attribute in the scheme, and the worst point is the maximum value of the attribute in the scheme.

$$B_i^+ = \sqrt{\sum_{j=1}^{n} (r_{ij} - u_j^+)^2}, i = 1, \ldots, m \quad (15)$$

$$B_i^- = \sqrt{\sum_{j=1}^{n} (r_{ij} - u_j^-)^2}, i = 1, \ldots, m \quad (16)$$

where $u_j^+$ denotes the maximum value of the attribute of the j-th target; $u_j^-$ denotes the minimum attribute value of the j-th target.

S503, the relative distance $C_i$ from each scheme to the optimal point and the worst point is calculated, the calculation method is as follows Formula (17), and the scheme with the maximum relative distance is the optimal scheme.

$$C_i = \frac{B_i^-}{B_i^+ + B_i^-} \quad (17)$$

Therefore, the invention uses the above-mentioned optimization method for bending rebound quantity of aluminum roll forming to analyze the aluminum roll forming process, combined with the multi-objective optimization algorithm, the decision variables with small bending rebound quantity and small thickness reduction are obtained, that is, the appropriate friction parameters and gap parameters of the contact surface between the aluminum and the upper roller of the roll forming machine, and the parameter setting of the high-precision roll forming process is realized.

Each chromosome in the algorithm corresponds to a decision variable sequence that affects the bending rebound quantity and thickness reduction, the decision variable sequence is encoded and decoded, crossover, mutation, selection, and other operations are performed between the sequences to make the chromosomes evolve and iterate continuously. Moreover, multi-attribute decision-making is used to decide on the optimal solution set, and the optimal process setting parameters with the minimum bending rebound quantity and the minimum thickness reduction are obtained. It solves the problem of large bending rebound quantity in roll forming technology, and has the advantages of improving the accuracy of roll forming process, improving production efficiency, and enhancing production flexibility.

Finally, it should be explained that the above embodiment is only used to explain the technical scheme of the invention rather than restrict it. Although the invention is described in detail concerning the better embodiment, the ordinary technical personnel in this field should understand that they can still modify or replace the technical scheme of the invention, and these modifications or equivalent substitutions cannot make the modified technical scheme out of the spirit and scope of the technical scheme of the invention.

What is claimed is:

1. An optimization method for a bending rebound quantity of aluminum roll forming, comprising the following steps:
   S1, analyzing a process of aluminum roll forming, and determining decision variables of aluminum rebound quantity and thickness reduction;
   S2, constructing an optimization model of the bending rebound quantity of aluminum roll forming based on a multi-objective optimization algorithm and clarifying constraints in the process of aluminum roll forming; wherein S2 includes:
   S201, constructing the optimization model of the bending rebound quantity of aluminum roll forming based on the multi-objective optimization algorithm, wherein the aluminum rebound quantity and the thickness reduction during aluminum roll forming are two objective functions; and
   S202, constructing constraints in the optimization model of the bending rebound quantity of aluminum roll forming based on the multi-objective optimization algorithm, wherein the following constraints are comprised during aluminum roll forming:

$$\mu_{min} \leq \mu \leq \mu_{max} \quad (2)$$

$$G_{min} \leq G \leq G_{max} \quad (3)$$

$$\omega_{min} \leq \omega \leq \omega_{max} \quad (4)$$

$$\Delta v \geq 0 \quad (5)$$

$$f_2 \leq T_{max} \quad (6)$$

Equation (1) is a friction coefficient constraint of a contact surface between the aluminum and an upper roll of a roll forming machine, wherein $\mu_{min}$ is a minimum allowable friction coefficient during a roll forming process; $\mu_{max}$ is a maximum allowable friction coefficient during the roll forming process; Equation (2) is a gap constraint between the aluminum and a roller during the roll forming process, and $G_{min}$ is a minimum allowable gap during the roll forming process; $G_{max}$ is a maximum allowable gap during the roll forming process; in Equation (3), $\omega_{max}$ denotes a maximum angle between the upper roll and a lower roll, and $\omega_{min}$ denotes a minimum angle between the upper roll and the lower roll; $\Delta v$ in Equation (4) denotes a velocity difference constraint between the upper roll and the lower roll; Equation (5) is a constraint of a required thickness reduction of the aluminum when processing a part, $T_{max}$ is a maximum value of the required thickness reduction;

S3, based on characteristics of the optimization model in S2, proposing a corresponding algorithm to optimize the aluminum rebound quantity and the thickness reduction; wherein S3 includes:
S301, population initialization, initializing the aluminum rebound quantity and the thickness reduction, population individual number during the aluminum forming process, selection probability and mutation probability of multi-objective optimization model, and setting a maximum number of iterations; and
S302, establishing a fitness function, and a specific description formula F is as follows:

$$F = \min(f^1, f_2) \quad (7)$$

wherein $f_1$ denotes the aluminum rebound quantity during the aluminum roll forming; $f_2$ denotes the thickness reduction during the aluminum roll forming;
S4, updating the decision variables that affect the aluminum rebound quantity and the thickness reduction;
S401, encoding and decoding;
S402, chromosome sequence crossover operation; wherein S402 includes:
  S4021, randomly selecting two crossover points $c_1$ and $c_2$ in a coding string of two parent individuals, and establishing a new archive set S;
  S4022, after the two crossover points are determined, exchanging partial genes of the two parental individuals $p_1$ and $p_2$ between the two crossover points to produce new offspring individuals;
  S4023, evaluating the new offspring individuals by a target value; and
  S4024, in an iteration process, when the new offspring individuals are better than some individuals in the new archive set S, adding the new offspring individuals to the new archive set S, and removing worse individuals from the new archive set S;

S403, chromosome mutation operation; wherein a chromosome sequence mutation method in S403 adopts a population evolution method, wherein S403 includes:

S4031, after chromosomes are crossed, recalculating two target values $f_1$ and $f_2$ of an individual population, and calculating an index value I for each individual, the calculation formula is as follows:

$$I = \frac{f_2 - f_1}{f_2 + f_1} \tag{8}$$

S4032, sorting the index value I of 2N individuals in the population, putting the individuals with a smaller index value I into a first population $P_1$, and putting the individuals with a larger index value I into a second population $P_2$; and S4033, mutating all individuals in the second population $P_2$, wherein the mutation method is a differential mutation:

S404, environmental selection mechanism; dividing an environmental selection into an individual convergence selection and a diversity selection, wherein S404 incudes:

S4041, using a Network-based Inference (NBI) method to generate a set of uniformly distributed reference vectors in a target space, wherein a formula for generating a number H of reference vectors is as follows:

$$H = C_{M+p-1}^{p} \tag{9}$$

wherein C denotes a combination in the permutation and combination; M denotes a number of optimization objectives; p denotes a number of copies of each target segmentation; 1/p denotes a segmentation step length;

S4042, combining the parents individuals and the offspring individuals, a number of populations at this time being 2N, calculating the target values of all individuals, and normalizing the target values of the individuals as follows:

$$\hat{f}_i(x) = \frac{f_i(x) - z_i^{min}}{z_i^{max} - z_i^{min}}, i = 1, 2, \ldots, M \tag{10}$$

wherein $\hat{f}_i(x)$ denotes a value of an i-th normalized objective function; M denotes a number of objective functions; $z_i^{max}$ and $z_i^{min}$ denote maximum and minimum values of an i-th objective function on all possible x values, respectively; $f_i(x)$ denotes an objective function value before normalization;

S4043, performing a non-dominated sorting on individuals in a region, and dividing all individuals in the population into different frontiers or levels according to normalized values of the two objectives;

S4044, taking first K frontiers in each region, so that the number of individuals n is greater than N; and S4045, in order to reduce the number of populations to N, using a hierarchical clustering method to cluster all currently retained individuals, and deleting a individuals from each class so that the number of populations is exactly N at this time; and S5, judging an iteration stop condition, and outputting a scheme that improves the bending rebound quantity of roll forming aluminum.

2. The optimization method for the bending rebound quantity of aluminum roll forming according to claim 1, wherein in S1, digitizing a rebound quantity problem of roll forming in the process of aluminum roll forming, and expressing a current problem by gene sequence, that is, a coding process, when coding the process, the coding process is divided into four parts: the friction coefficient, the gap between the aluminum and the roll during the roll forming process, an angle between the upper roll and the lower roll and a speed difference between the upper roll and the lower roll:

$$[\mu_k \ G_k \ \omega_k \ \Delta v_k] = \begin{bmatrix} \mu_1 G_1 & \omega_1 & \Delta v_1 \\ \mu_2 G_2 & \omega_2 & \Delta v_2 \\ \ldots & \ldots & \ldots \\ \mu_n G_n & \omega_n & \Delta v_n \end{bmatrix} \tag{6}$$

wherein μ denotes the friction coefficient of the contact surface between the aluminum and the upper roll of the roll forming machine; G denotes the gap between the aluminum and the roll during the roll forming process; ω denotes the angle between the upper roll and the lower roll; Δv denotes the speed difference between the upper roll and the lower roll; n denotes a number of individuals in a population; k={1, 2, 3, ..., n}.

3. The optimization method for the bending rebound quantity of aluminum roll forming according to claim 1, wherein S5 includes:

setting the maximum number of iterations, when a number of individual evolution iterations in a population reaches the maximum number of iterations, obtaining a feasible solution satisfying a constraint condition; and then, using a multi-attribute decision-making technique for order preference by similarity to ideal solution (TOPSIS) method to select an optimal solution in a set of solutions, and calculating distances from each individual in the set of solutions to an optimal point and a worst point respectively, and sorting all calculated distances, wherein a solution closest to the optimal point and furthest from the worst point is regarded as the optimal solution.

* * * * *